US 6,542,329 B2

(12) United States Patent
Kojima (10) Patent No.: US 6,542,329 B2
(45) Date of Patent: Apr. 1, 2003

(54) HOLDER MOUNTING STRUCTURE (75) Inventor: Yasushi Kojima, Nishinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 118 days.

(21) Appl. No.: 09/862,337

(22) Filed: May 23, 2001

(65) Prior Publication Data

US 2001/0048572 A1 Dec. 6, 2001

(30) Foreign Application Priority Data

May 26, 2000 (JP) ....................................... 2000-155893

(51) Int. Cl.⁷ .............................................. G11B 17/02
(52) U.S. Cl. ................................................... 360/99.06
(58) Field of Search .......................... 360/99.02, 99.03, 360/99.06, 99.07; 369/75.2

(56) References Cited

U.S. PATENT DOCUMENTS 4,573,093 A  *  2/1986  Obama et al. ........... 360/99.06
4,734,801 A  *  3/1988  Takeda et al. ........... 360/99.06
4,740,937 A  *  4/1988  Watanabe .................. 369/13.2
5,124,854 A  *  6/1992  Iyota et al. ................ 360/96.6
6,144,629 A  *  11/2000 Kurita et al. .............. 369/77.2
6,239,945 B1 *  5/2001  Inoue et al. ............. 360/99.02
6,344,945 B1 *  2/2002  Ariyoshi .................. 360/99.06

* cited by examiner

Primary Examiner—Robert S. Tupper
(74) Attorney, Agent, or Firm—Armstrong, Westerman & Hattori, LLP.

(57) ABSTRACT

A holder is pivoted to a chassis upwardly and downwardly movably. A lateral shift restraining piece is positioned on the chassis at a small distance away from an inner side surface of the holder, is opposed to a side plate of the holder in a horizontal posture, and is out of opposed relation with the side plate when the holder is in an upright posture. A pivotal movement restraining piece is elastically deformably provided on the chassis for preventing the holder from opening excessively by the contact of an end thereof with the holder when the holder is pivotally moved upward.

3 Claims, 12 Drawing Sheets

HOLDER MOUNTING STRUCTURE

FIELD OF THE INVENTION

The present invention relates to holder mounting structures, and more particularly to a structure by which a holder for accommodating a cartridge for use in disk recording or playback devices is mounted on a chassis equipped with optical components.

BACKGROUND OF THE INVENTION

Figure 12:
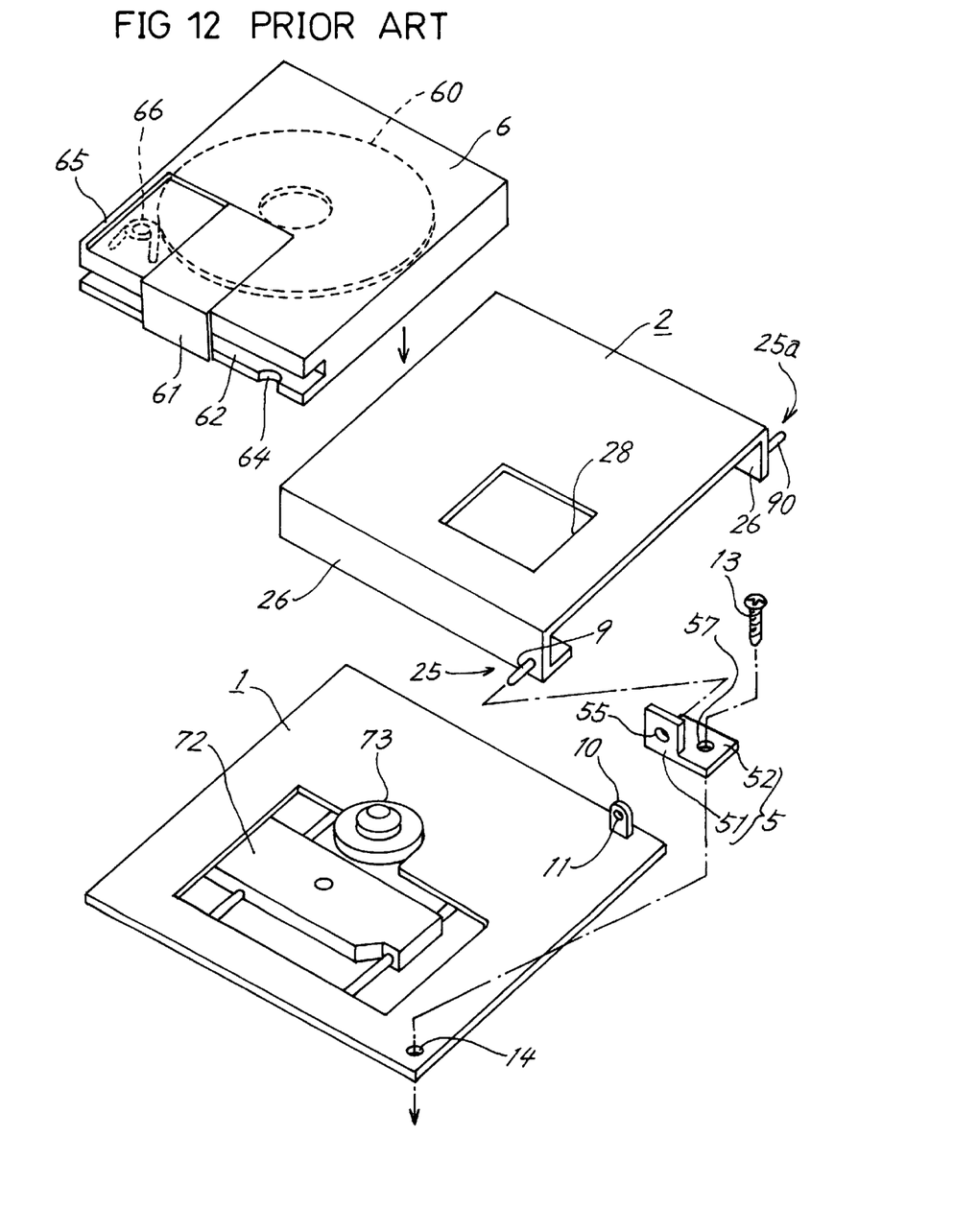
FIG. 12 is an exploded perspective view of a conventional disk recording or playback device.

FIG. 12 is an exploded perspective view of a conventional disk recording or playback device.

A holder 2 has opposite sides of its base end pivoted as at 25, 25a to a chassis 1 equipped with a turntable 73 and a pickup 72. A cartridge 6 having a disk 60 enclosed therein is inserted into the holder 2. In the following description, the direction in which the cartridge 6 is inserted into the holder 2 will be referred to as "front," and the direction in which the cartridge 6 is unloaded from the holder 2 as "rear."

The pivoted portion 25 comprises a first pivot 9 projecting outward from one side plate of the holder 2 and fitted in a bracket 5 fastened to the chassis 1 with a screw 13. The other pivoted portion 25a comprises a second pivot 90 projecting outward from the other side plate of the holder 2 and fitted in a hole 11 in a lug 10 provided upright on the chassis 1. The bracket 5 comprises an support wall 51 orthogonal to the upper surface of the chassis 1 and having a first hole 55 for the first pivot 9 to extend therethrough, and a base 52 having a second hole 57 with the screw 13 inserted therethrough.

To mount the holder 2 on the chassis 1, the first pivot 9 is fitted into the first hole 55 in the bracket 5 in advance. The holder 2 and the bracket 5 in this state are carried toward the chassis 1, the second pivot 90 is fitted into the lug 10 and the bracket 5 is placed on the chassis 1. The screw 13 is then inserted through the second 57 and driven into a screw hole 14 in the chassis 1 to fasten the bracket 5 to the chassis 1. Since the bracket 5 as fitted to the holder 2 is attached to the chassis 1, the screw hole 14 needs to be provided at a position not to be covered with the holder 2.

The conventional device therefore has the following problems.

The screw hole 14 is formed in the chassis 1, as positioned externally of the holder 2. This makes the chassis 1 larger.

Figure 13:
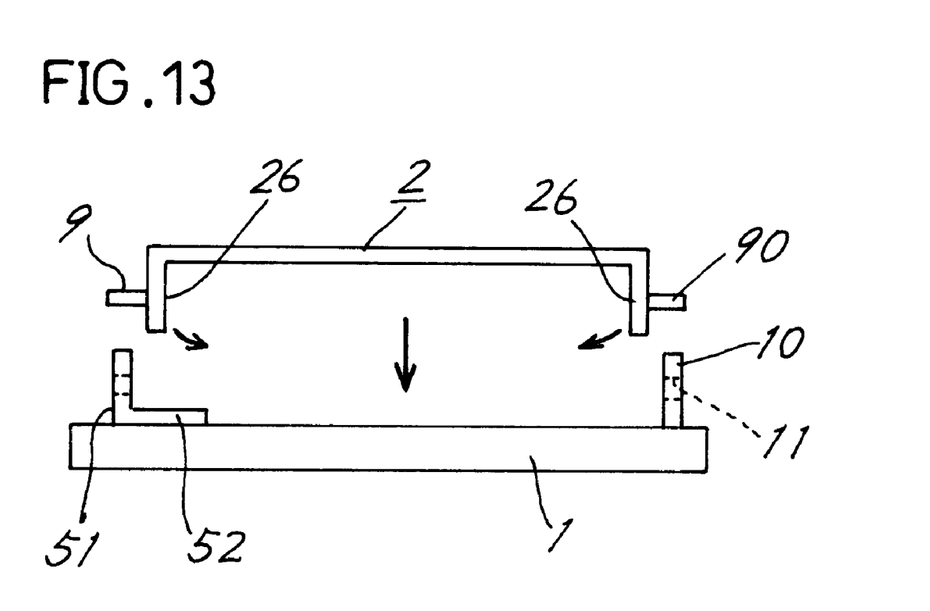
FIG. 13 is a front view showing an exemplary mode of attaching a holder.

If the bracket 5 as fitted to the holder 2 is attached to the chassis 1, both the bracket 5 and the holder 2 must be held by hand for attaching, hence a low work efficiency. In view of this drawback, the applicant conceived the idea of fitting the holder 2 to the bracket 5 which is fastened to the chassis 1 in advance. In this case, it appears feasible to attach the holder 2 to the bracket 5 with opposite side plates 26, 26 of the holder 2 deflected as indicated in FIG. 13, whereas the holder 2 is prepared generally from a steel sheet and is therefore difficult to deflect.

Accordingly, it appears possible to fit the holder 2 to the bracket 5 from lateral one direction without deflecting the side plates 26, 26 as will be described later. However, if the holder 2 backlashes laterally, the disk 60 in the cartridge 6 will not be placed on the turntable 73 accurately, so that there arises a need to restrain the holder 2 from backlashing.

SUMMARY OF THE INVENTION

An object of the present invention is to make a holder mountable on a chassis of reduced size with an improved work efficiency and to restrain the holder from backlashing laterally.

A lateral shift restraining piece 53 is positioned on a chassis 1 at a small distance away from an inner side surface of the holder 2, is opposed to a side plate 26 of the holder 2 in a horizontal posture, and is out of opposed relation with the side plate 26 when the holder 2 is in an upright posture.

A pivotal movement restraining piece 54 is elastically deformably provided on the chassis 1 for preventing the holder 2 from opening excessively by the contact of an end thereof with the holder 2 when the holder 2 is pivotally moved upward.

The present invention has the following advantages because of the construction described.

1. To mount the holder 2 on the chassis 1, the holder 2 is positioned upright with the side plate 26 opposed to a support wall 51. The holder 2 is moved laterally toward the support wall 51, causing the support wall 51 to pivotally support the holder as at 25. At this time, the lateral shift restraining piece 53 is not opposed to the side plate 26 and will not interfere with the movement of the holder 2.

Next, the holder 2 is pivotally moved downward about the pivot portion 25. The restraining plate 53 is opposed to the side plate 26, with the holder 2 in its horizontal posture, and is positioned inwardly of the side plate 26, whereby the holder 2 as attached to the support wall 51 is restrained from shifting laterally.

Since the holder 2 can be mounted on the chassis 1 after the support wall 51 is provided on the chassis 1 in advance, there is no need to form a screw hole 14 at a position which will not be covered with the holder 2 as in the prior art. This serves to make the chassis 1 small-sized.

2. When the holder 2 is pivotally moved from the upright posture to the horizontal posture to mount the holder 2 on the chassis 1, the pivotal movement restraining piece 54 is elastically deformed by being pushed by the holder 2, permitting the holder 2 to move past the restraining piece 54. When pivotally moved upward, the holder 2 comes into contact with the end of the pivotal movement restraining member 54, which in turn prevents the holder 2 from opening excessively.

Because the holder 2 mounted on the chassis 1 is restrained from opening to excess in this way, it is unlikely that the holder 2 will be brought to the upright posture to become released from the chassis 1 inadvertently.

DESCRIPTION OF THE PREFERRED EMBODIMENT

An embodiment of the invention will be described below in detail with reference to the drawings.

Cartridges 6 for use in the device of this embodiment are the same as the conventional one shown in FIG. 12. The construction of the cartridge 6 will be described first.

The cartridge 6 has a groove 62 in one side portion thereof and a recessed portion 65 in its upper surface. A shutter 61 is slidably disposed in the recessed portion 65 and fitted over the groove 62. The shutter 61 is biased in a closing direction by a torsion spring 66 inside the cartridge 6. A caved portion 64 is formed in the bottom wall of the cartridge 6 for the slide member 3 to be described later to fit in. While the shutter 61 is in an opened state, a disk 60 within the cartridge 6 is partly exposed for recording or reproducing signals.

(Overall Construction)

Figure 1:
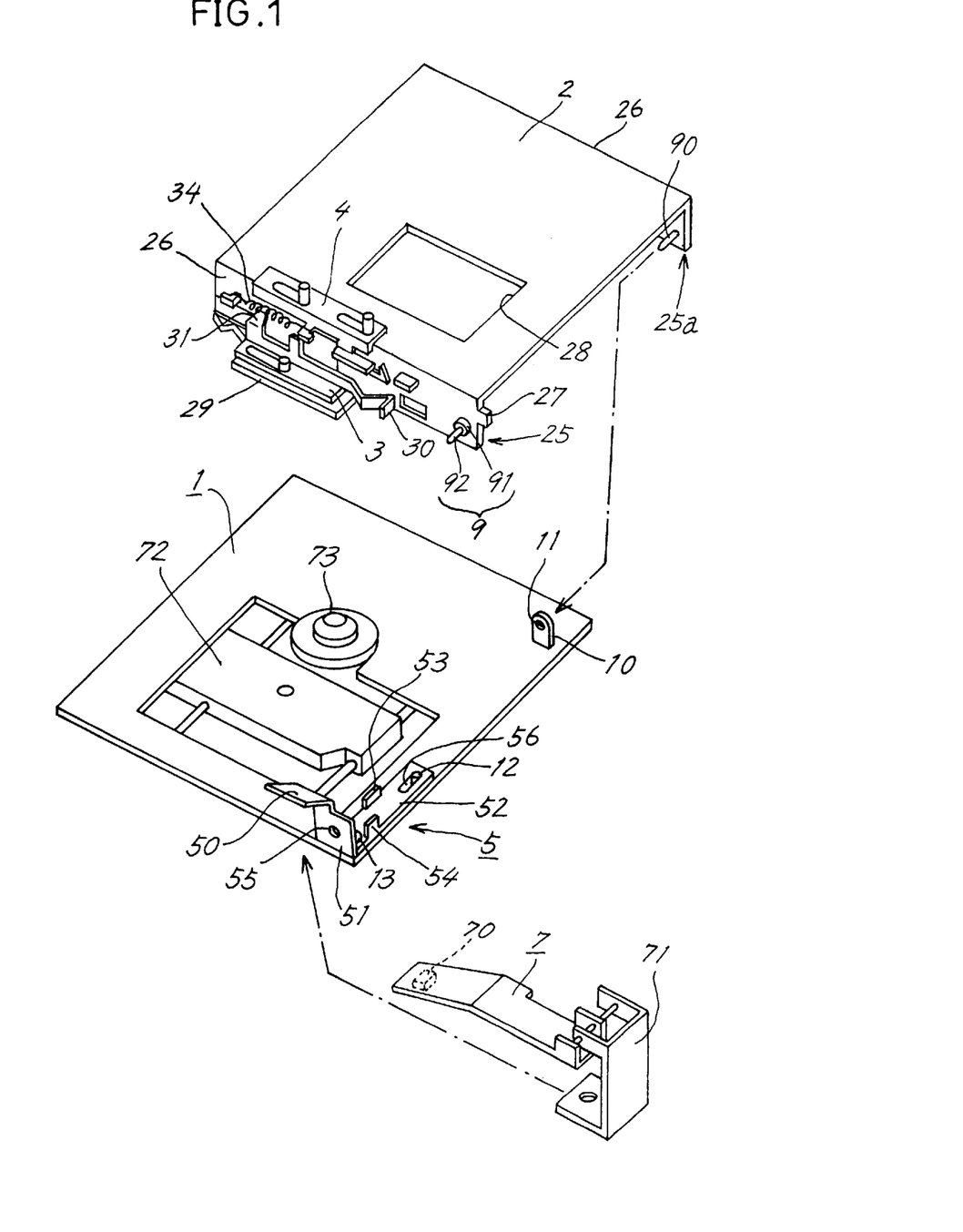
FIG. 1 is an exploded perspective view of a disk recording or playback device.

FIG. 1 is an exploded perspective view of a disk recording or playback device. A holder 2 is pivoted as at 25, 25a at one end thereof to a chassis 1 provided with a pickup 72, and the cartridge 6 is inserted into the holder 2. The pickup 72 is movable toward or away from a turntable 73. A bracket 71 is attached to the bottom face of the pickup 72. A head lever 7 provided with a recording head 70 at an outer end thereof is pivoted at a base end thereof to the bracket 71. The head lever 7 is advanced by a lift mechanism (not shown) into the holder 2 through an opening 28 formed in an upper wall of the holder 2. The disk 60 in the cartridge 6 is accessible by the recording head 70 for signal recording as in the prior art.

The holder 2 is made from a steel sheet by bending and has a first pivot 9 projecting outward from a front end portion of one side plate 26 thereof, and a second pivot 90 projecting inward from a front end portion of the other side plate 26 thereof. The first pivot 9 comprises a large-diameter rod 91 and a small-diameter rod 92 extending from the rod 91. In the vicinity of the first pivot 9, a pushing projection 27 extends forward from the front end of the holder 2.

A bracket 5 made from a thin metal sheet by bending is provided at a corner of the front end of the chassis 1. The bracket 5 comprises a base 52 in contact with the upper surface of the chassis 1, a support wall 51 extending upright from the base 52 and opposed to the side plate 26 of the holder 2, a lateral shift restraining piece 53 extending upright from the base 52 and space apart by a small clearance from the inner side face of the holder 2, and a pivotal movement restraining piece 54 disposed approximately in parallel to the restraining piece 53 and elastically deformable forward or rearward. The support wall 51 has an upper end extending rearward to provide a release piece 50 extending upward as inclined outward.

The base 52 extends laterally and has a slit 56 formed in a right end portion thereof. The base 52 is fastened to the chassis with a screw 13 at a left end base portion covered with the holder 2. The slit 56 has fitted therein a pin 12 projecting from the chassis 1, whereby the rotational shift of the bracket 5 about the screw 13 is restrained.

The small-diameter rod 92 on the holder 2 is fitted in a hole 55 formed in the support wall 51 to provide the pivot portion 25 of the holder 2. Alternatively, the support wall 51 may by provided with the small-diameter rod 92, with the hole 55 formed in the holder 2. The other pivot portion 25a is provided by fitting the second pivot 90 projecting outward from the other side plate of the holder 2 into a hole 11 in a lug 10 projecting from a right end portion of the chassis 1.

A support plate 29 extends outward from the lower end of one side plate of the holder 2. Supported on the support plate 29 is a slide member 3 biased rearward by a spring 34 and to be pushed in by the cartridge 6. A lock slide 4 to be pushed by the slide member 3 is disposed above the slide member 3. The slide member 3 and the lock slide 4 will be described in detail later.

(Mounting the Holder)

Figure 2:
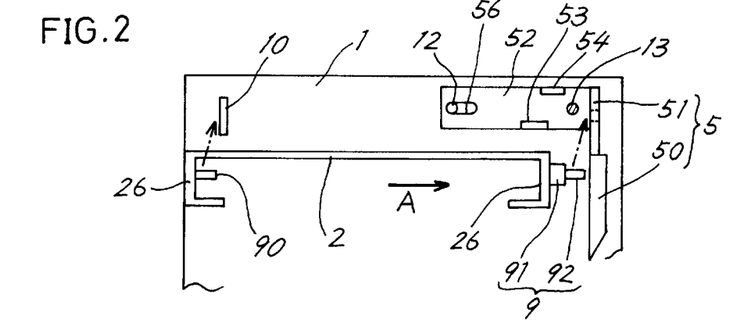
FIG. 2 is a plan view of a holder in an upright posture.
Figure 3A:
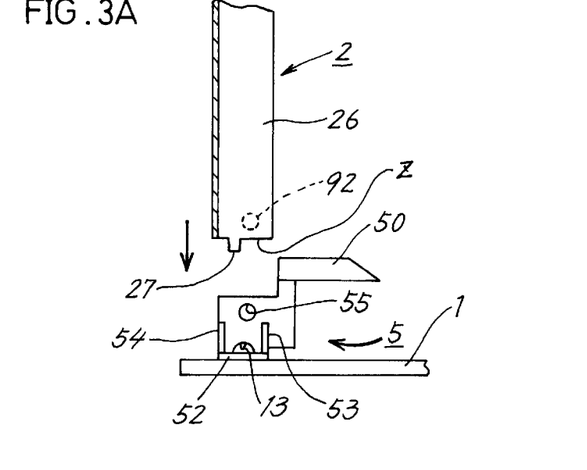
FIG. 3A, FIG. 3B are side elevations of the holder of FIG. 2 as it is seen from the direction A, FIG. 3A showing the holder in the upright posture, FIG. 3B showing the holder while it is being pivotally moved downward.
Figure 3B:
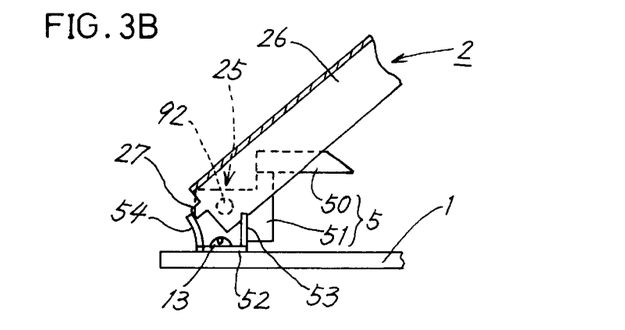

The holder 2 is attached in an upright posture to the bracket 5. The present invention is characterized by the structure for mounting the holder 2. FIG. 2 is a plan view of the holder 2 in the upright posture. For the sake of convenience of description, the slide member 3 and the lock slide 4 are omitted from FIG. 2. FIG. 3A, FIG. 3B are side elevations showing the holder 2 as partly broken away and as seen from the direction A in FIG. 2.

To mount the holder 2 on the chassis 1, the holder 2 in the upright posture is lowered toward the bracket 5 and the lug 10 as shown in FIG. 2 and FIG. 3A to oppose the pivots 9, 90 to the support wall 51 and the lug 10, respectively. At this time, the lateral shift restraining piece 53 is positioned at a lower level than the lower edge Z of the side plate 26 of the holder 2 and will not interfere with the lateral movement of the holder 2.

Next, the holder 2 is moved laterally toward the bracket 5 and the lug 10 to fit the pivots 9, 90 respectively into the hole 55 of the support wall 51 and the hole 11 in the lug 10. The right side plate 26 of the holder 2 is positioned between the lateral shift restraining piece 53 and the support wall 51, and the holder 2 is pivotally supported on the chassis 1 as at 25, 25a. When the holder 2 is pivotally lowered about the pivot portion 25 as seen in FIG. 3B, the pushing projection 27 pushes the pivotal movement restraining piece 54 forward for elastic deformation.

Figure 4A:
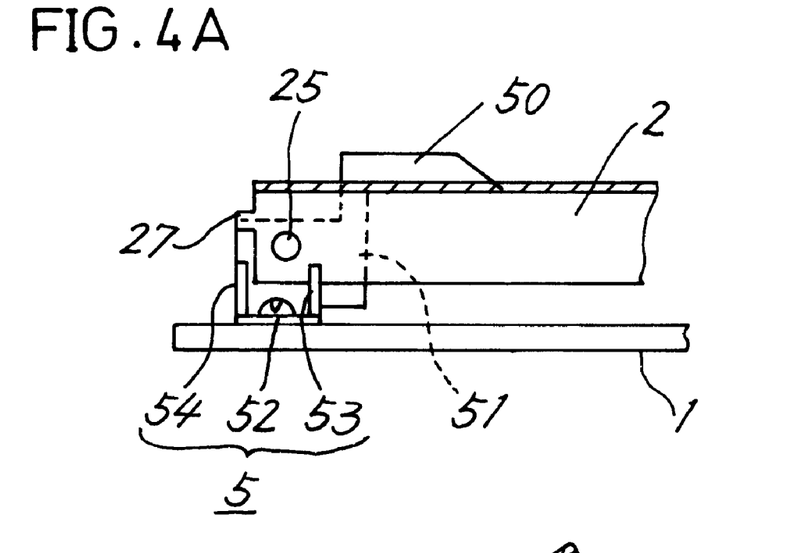
FIG. 4A, FIG. 4B are side elevations of the holder of FIG. 2 as it is seen from the direction A, FIG. 4A showing the holder in a horizontal posture, FIG. 4B showing the holder while it is being pivotally moved upward.

Upon the pushing projection 27 moving past the restraining piece 54, the restraining piece 54 restores itself elastically, with the holder 2 in a horizontal position as seen in FIG. 4A. With the side plate 26 opposed to the lateral shift restraining piece 53, the holder 2 is restrained by the restraining piece 53 and the support wall 51 from backlashing laterally. The pushing projection 27 is positioned above the pivotal movement restraining piece 54.

Figure 4B:
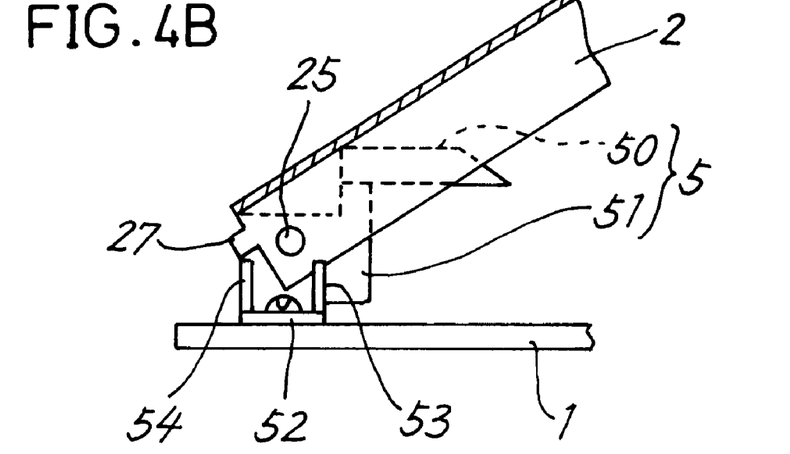

If the holder 2 in the horizontal position is opened through more than a predetermined angle, the pushing projection 27 comes into contact with the upper end of the pivotal movement restraining piece 54 as seen in FIG. 4B. Since the projection 27 pushes the restraining piece 54 downward, the restraining piece 54 will not deflect for deformation.

Consequently, the holder 2 is restrained from pivotally moving to the upright position to open excessively. When the holder 2 is in its upright posture, the lateral shift restraining piece 53 is positioned at a lower level than the side plate 26 of the holder 2 as stated above, and the holder 2 is then likely to inadvertently moving out of engagement with the chassis 1, whereas once the holder 2 is mounted on the chassis 1, the holder 2 is immovable to the upright posture and therefore will not become released from the chassis 1.

With the present embodiment, the holder 2 is attached to the bracket 5 after the bracket 5 is fastened to the chassis 1 with the screw, so that the screw 13 for fastening can be provided at a position to be covered with the holder 2. This serves to make the chassis 1 compact.

(Engaging and Disengaging the Lock Slide)

As previously stated, the bracket 5 has the release piece 50 at the upper end of the support wall 51. The release piece 50 is necessary for kicking out the cartridge 6 in the holder 2 rearward when the holder 2 is opened. The present embodiment is characterized in that the release piece 50 and the holder 2 are diminished in variations in lateral dimensions. The release piece 50 and the lock slide 4 which is changed over for locking action by the release piece 50 will be described.

Figure 5:
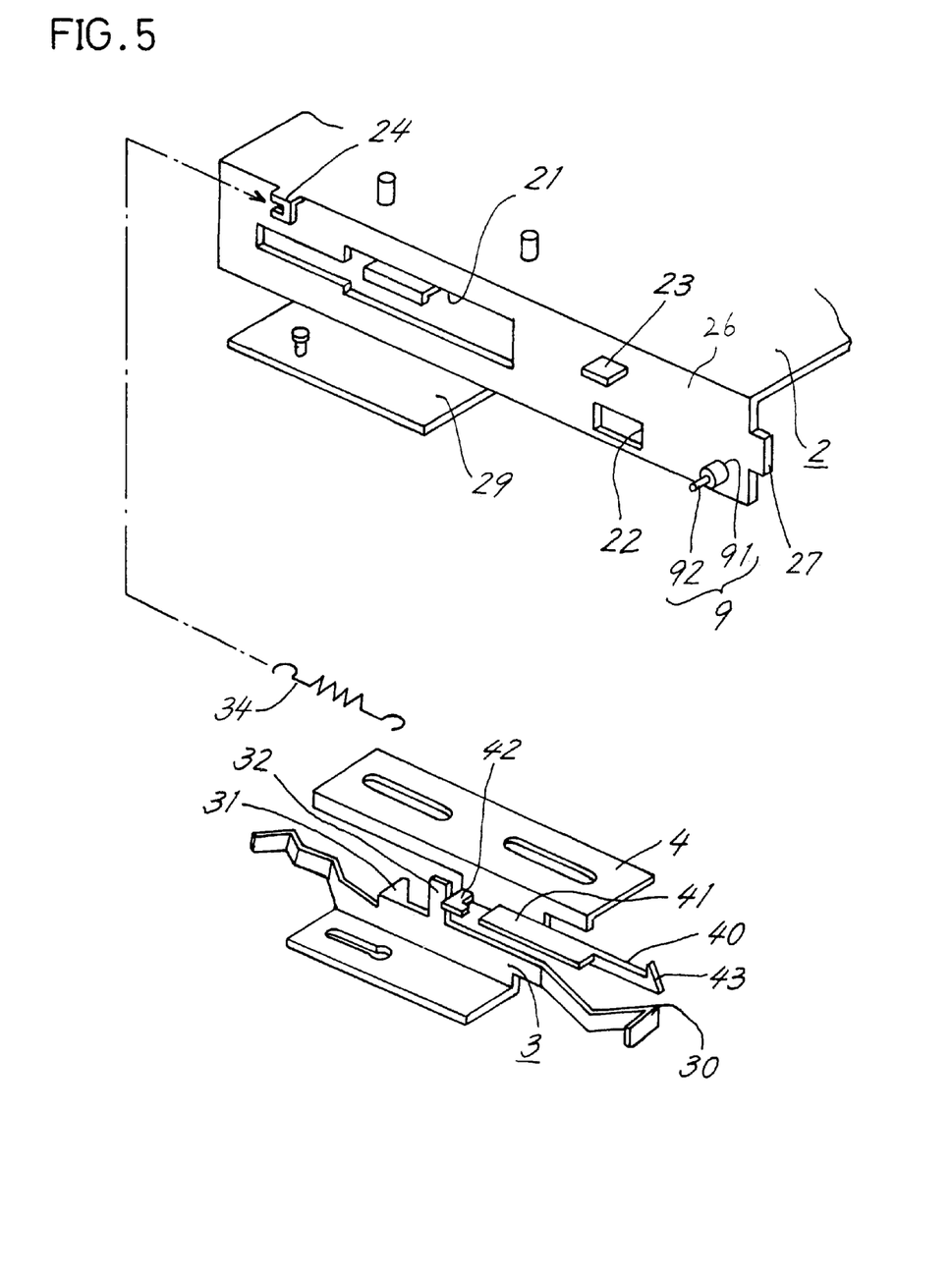
FIG. 5 is an exploded perspective view of the holder, a lock slide and a slide member.

FIG. 5 is an exploded perspective view of the holder 2, lock slide 4 and slide member 3. The lock slide 4 is in contact with the upper wall of the holder 2 and is disposed above the slide member 3. The slide member 3 and the lock slide 4 are movable in cartridge loading and unloading directions.

The slide member 3 is formed by bending a metal plate and integrally has an opening piece 31 projecting inward from the rear end thereof, a projection 32 extending upward from the approximate midportion of its length, and a latch 30 positioned at the front end of the member 3 and having an inwardly projecting forward end. The opening piece 31 advances into the holder 2 through an aperture 21 formed in the holder 2 to come into contact with an end face of the shutter 61(see FIG. 12).

The lock slide 4 is formed by bending a metal plate and integrally has an engaging hook 40 extending from the lengthwise midportion thereof toward a front end, and a spring retainer 42. The engaging hook 40 is elastically deformable downward and has a slope 43 at its front end. A push plate 41 extends outward approximately from the base end of the latch 30.

The holder 2 has formed in its side plate 26 the aperture 21 and a hole 22 positioned forwardly of the aperture 21. The latch 30 fits into the hole 22 when the cartridge 6 is completely loaded into the holder 2. Projecting outward from the holder side wall 26 above the hole 22 is a lug 23 with which the engaging hook 40 of the lock slide 4 is engageable.

A hook 24 is provided on the holder 2 at a rear end portion thereof. A tension spring 34 engaged with the hook 24 and the spring retainer 42 biases the lock slide 4 rearward. The lock slide 4 biases the slide member 3 rearward by virtue of the contact of the projection 32 of the slide member 3 with the rear side of the spring retainer 42. The biasing force of the tension spring 34 is greater than the shutter biasing force of the torsion spring 66 (see FIG. 12) inside the cartridge 6.

The cartridge 6 is loaded into the holder 2 as pivotally moved upward. Signals are recorded or reproduced when the cartridge 6 is positioned as opposed to the chassis 1 by the holder 2 pivotally moved downward. For the convenience of description, the head lever 7 will not be described below.

Figure 6A:
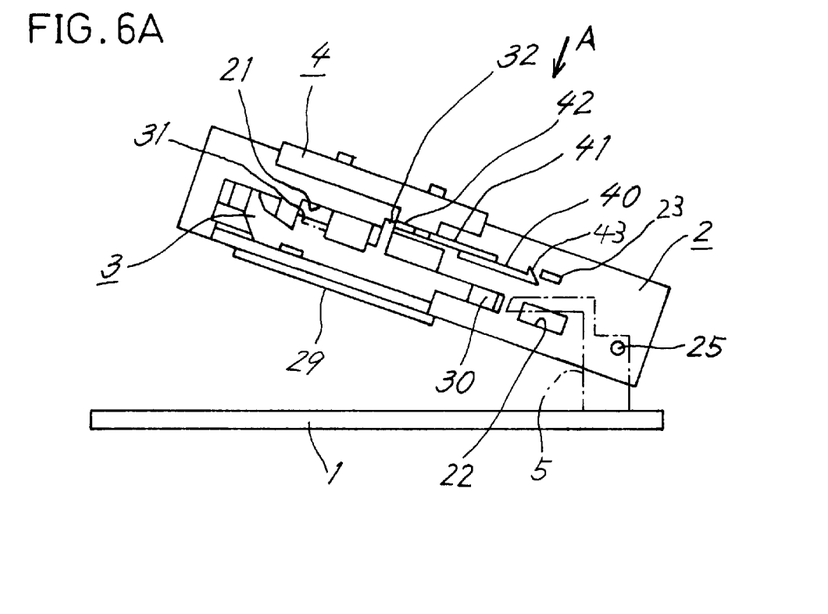
FIG. 6A, FIG. 6B are side elevations of the holder in a raised position, FIG. 6A showing the holder ready for the loading of a cartridge, FIG. 6B showing the holder with the cartridge completely loaded therein.
Figure 6B:
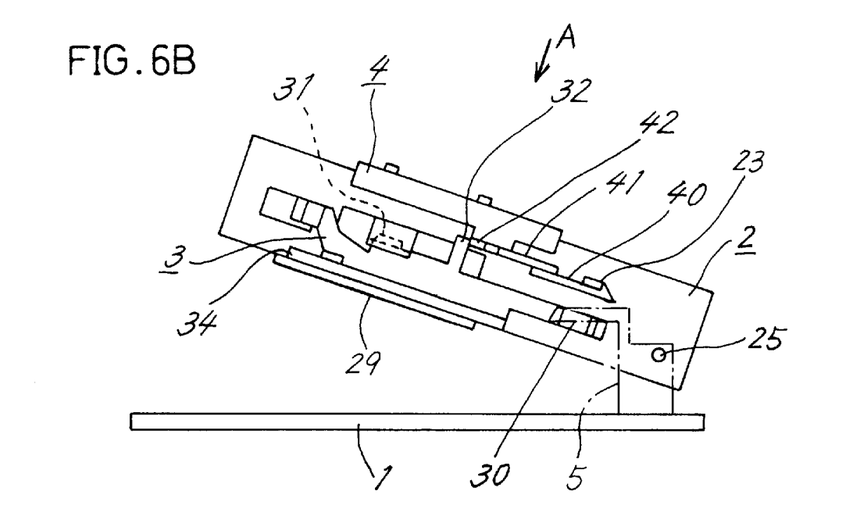
Figure 7A:
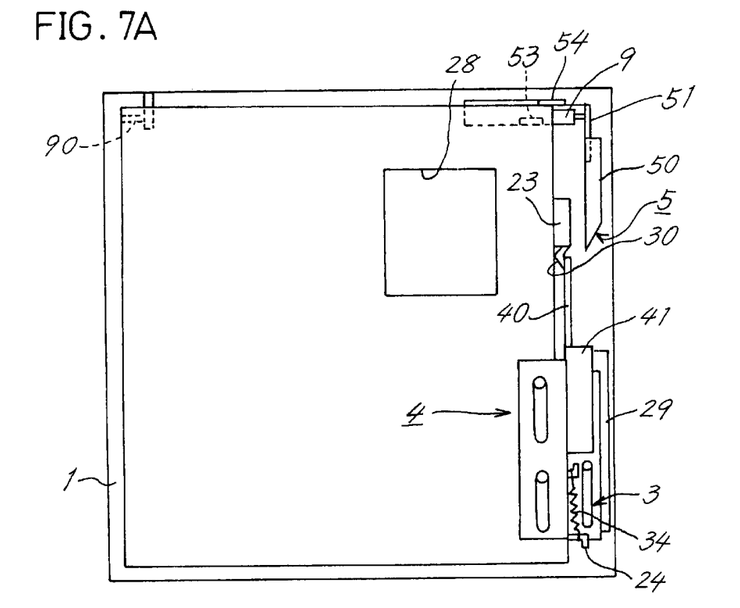
FIG. 7A, FIG. 7B are views corresponding respectively to FIG. 6A, FIG. 6B as the holder is seen from the direction A.
Figure 7B:
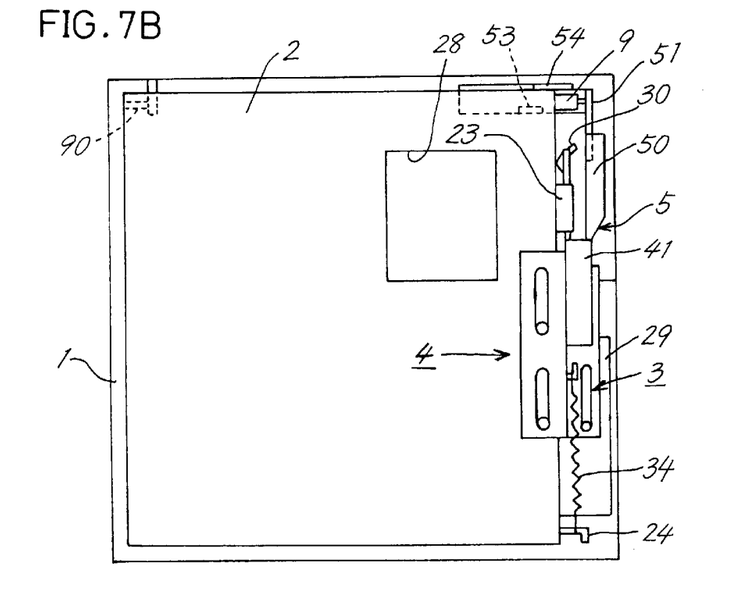

FIG. 6A and FIG. 6B are side elevations of the holder 2 in a raised position, FIG. 6A showing the holder ready for the loading of the cartridge 6, FIG. 6B showing the cartridge 6 as loaded completely. FIG. 7A and FIG. 7B are views corresponding respectively to FIG. 6A and FIG. 6B as the holder is seen from the direction A. For the convenience of illustration, the pivots 9, 90 are directed laterally. The slope 43 of the engaging hook 40 is positioned to the rear of the lug 23 before the cartridge 6 is loaded. The latch 30 is positioned in the rear of the hole 22 of the holder 2 and is warped outward by contact with the side wall of the holder 2. Further as shown in FIG. 7A, the engaging hook 40 is positioned inwardly of the release piece 50.

The operations of loading the cartridge, lowering the holder, raising the holder and unloading the cartridge will be described below as divided in this way.

(Loading the Cartridge)

FIGS. 8A, 8B, 9A and 9B are plan views of the holder 2 in section. For the convenience of illustration, the lock slide 4 and the tension spring 34 are not shown.

Figure 8A:
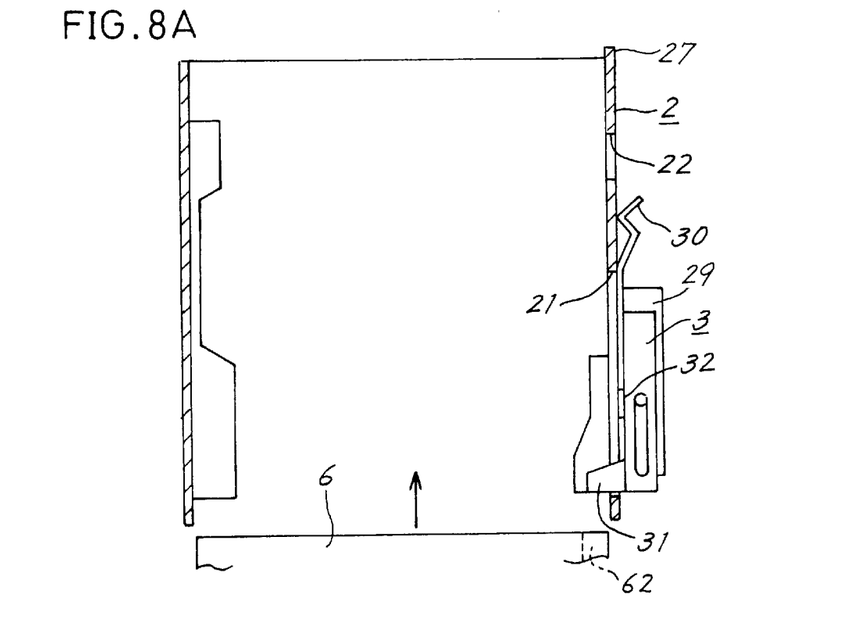
FIG. 8A, FIG. 8B are plan views of the holder in section.
Figure 8B:
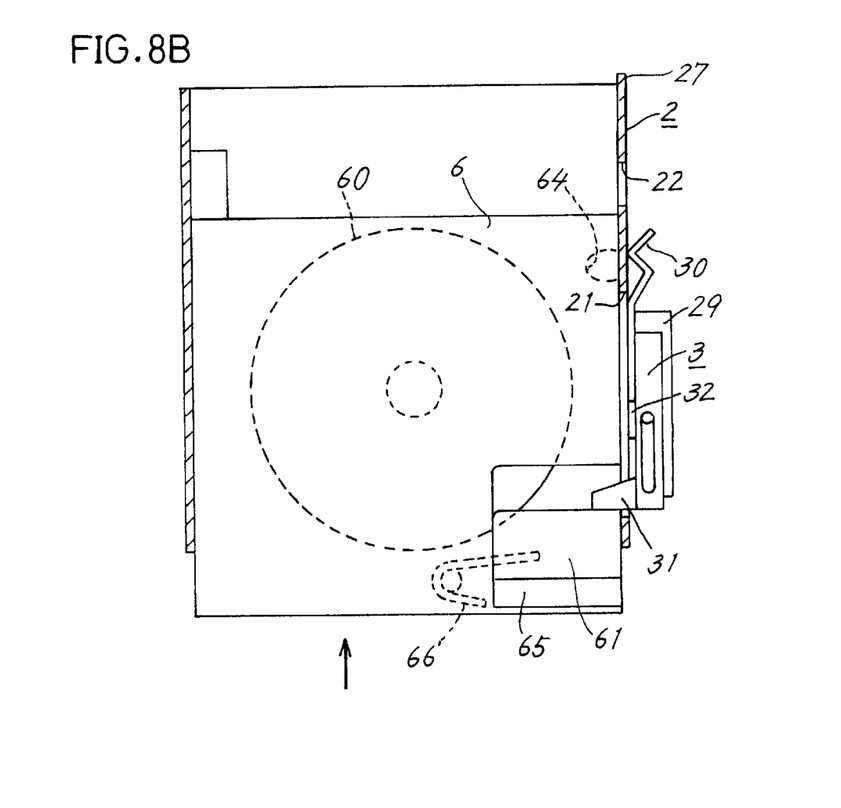

When the cartridge 6 is inserted into the holder 2 in the state shown in FIG. 8A, the opening piece 31 of the slide member 3 fits into the groove 62 of the cartridge 6 and comes into contact with the shutter 61. Since the force of the tension spring 34 biasing the slide member 3 rearward is greater than the force of the torsion spring 66 of the cartridge 6, the slide member 3 remains unmoved even if the cartridge 6 is pushed as shown in FIG. 8B. The shutter 61 is opened against the torsion spring 66.

When the shutter 61 is completely opened, the shutter 61 comes into contact with the rear edge of the recessed portion 65. The latch 30 does not reach the hole 22 since the slide member 3 remains unmoved.

Figure 9A:
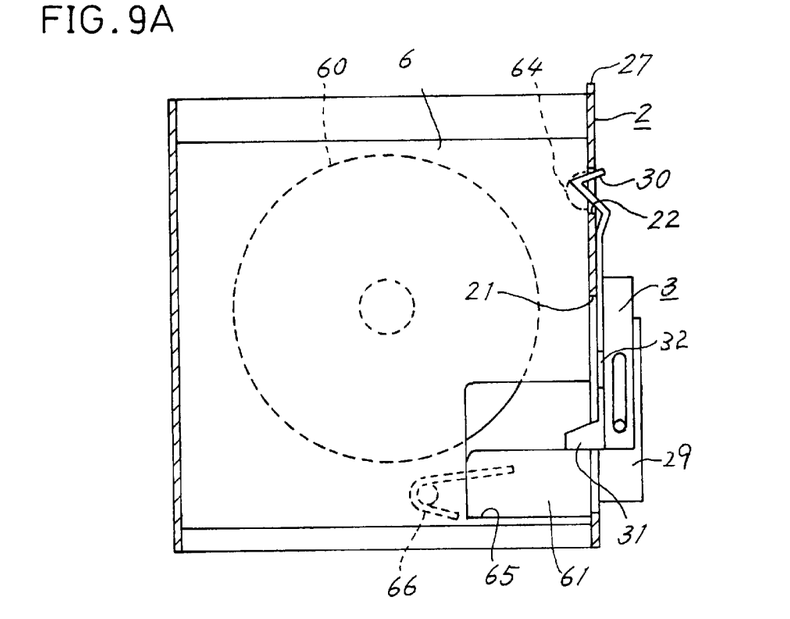
FIG. 9A, FIG. 9B are plan views of the holder in section.
Figure 9B:
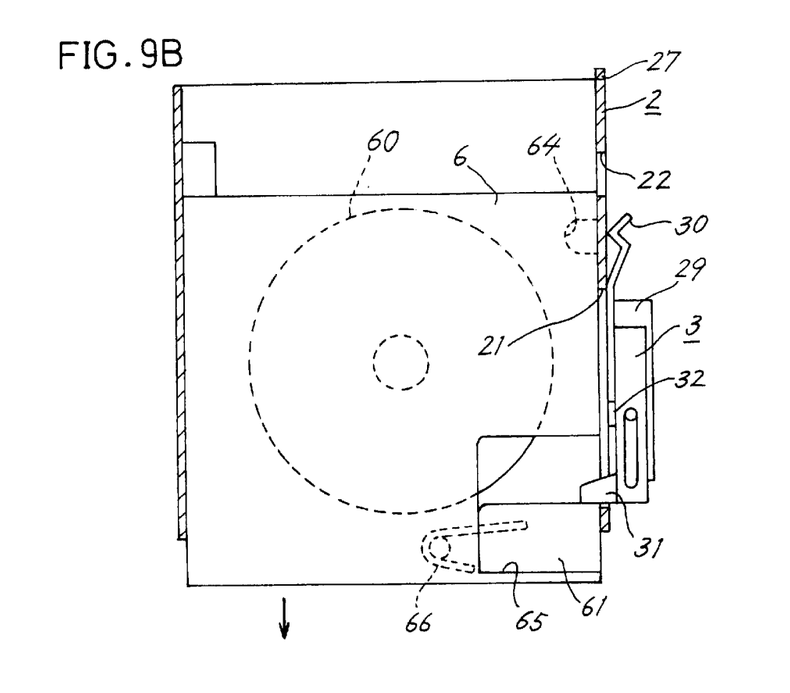

When the cartridge 6 is further pushed in from the first position, the shutter 61, which is unable to further open, pushes the opening piece 31 of he slide member 3. The slide member 3 advances, causing the latch 30 to fit into the hole 22 as shown in FIG. 9A. The latch 30 extending through the hole 22 lightly engages in the caved portion 64 of the cartridge 6. The cartridge 6 is held completely loaded.

On the other hand, with the projection 32 of the slide member 3 in contact with the spring retainer 42 of the lock slide 4, the lock slide 4 advances against the tension spring 34 when the slide member 3 is pushed. The slope 43 of the engaging hook 40 comes into contact with the lug 23 of the holder 2 from the state shown in FIG. 6A, whereby the hook 40 is deformed by deflection. Upon the slope 43 moving past the lug 23, the hook 40 elastically restores itself to become engaged with the lug 23 as seen in FIG. 6B.

(Lowering the Holder)

Figure 10A:
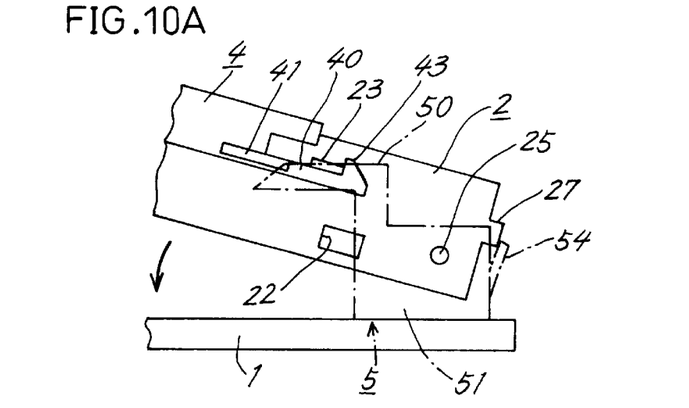
FIG. 10A, FIG. 10B, FIG. 10C are side elevations of a release piece and an engaging hook, FIG. 10A showing the same when the holder is pivotally moved down, FIG. 10B showing the same when the holder is in the horizontal posture, FIG. 10C showing the same while the holder is being pivotally moved upward.
Figure 10B:
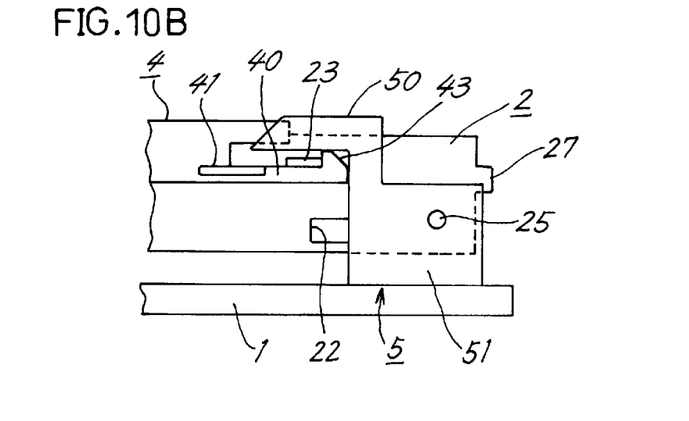
Figure 11A:
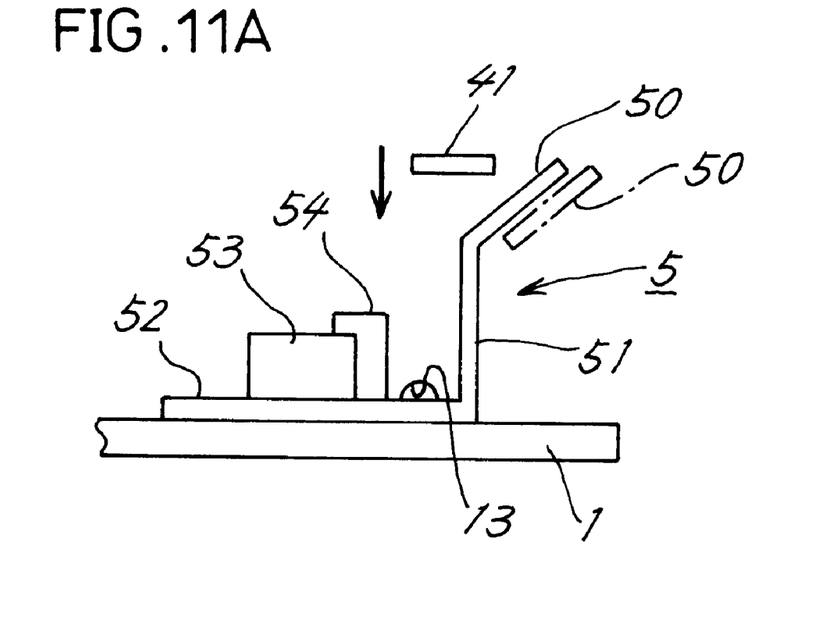
FIG. 11A is a front view of a bracket.

FIGS. 10A, 10B and 10C are enlarged side elevations of the release piece 50 and the engaging hook 40. For recording or playback, the holder 2 is lowered as shown in FIG. 10A. The push plate 41 of the lock slide 4 comes into contact with the release piece 50. Although biased upward, the engaging hook 40 is restrained from deflecting and deforming upward by contact with the lug 23. As indicated in a chain line in FIG. 11A, the lock slide 4 pushes the release piece 50 outward to deform the piece 50 by deflection. The release piece 50 is moved out of the path of downward movement of the holder 2, permitting the descent of the holder 2. On completion of the downward movement of the holder 2, the engaging hook 40 moves past the release piece 50, which in turn restores itself elastically (see FIG. 10B).

With the holder 2 lowered completely, the head lever 7 (see FIG. 1) is lowered by the lift mechanism into contact with the disk 60 to record signals.

(Raising the Holder and Unloading the Cartridge)

When the user is to take out the cartridge 6 from the holder 2, the holder 2 is pivotally moved upward by hand.

Figure 10C:
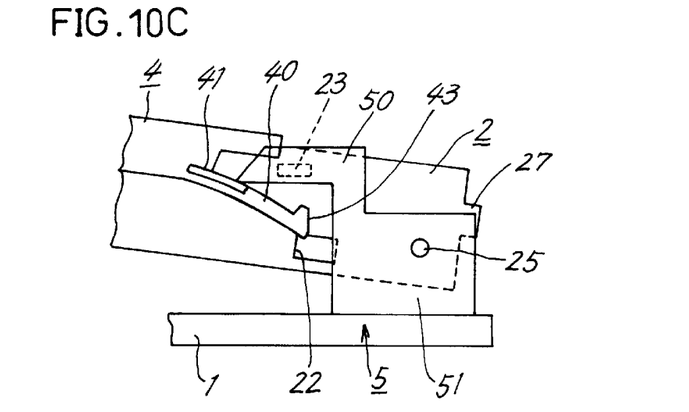

When the holder 2 is thus raised, the push plate 41 of the lock slide 4 is brought into contact with the lower end of the release piece 50, which deflects the engaging hook 40 downward for deformation as seen in FIG. 10C. The engaging hook 40 is disengaged from the lug 23, causing the tension spring 34 to move the lock slide 4 toward a cartridge unloading direction from the state shown in FIG. 6B. The shutter 61 of the cartridge 6 is closed by the torsion spring 66.

Figure 11B:
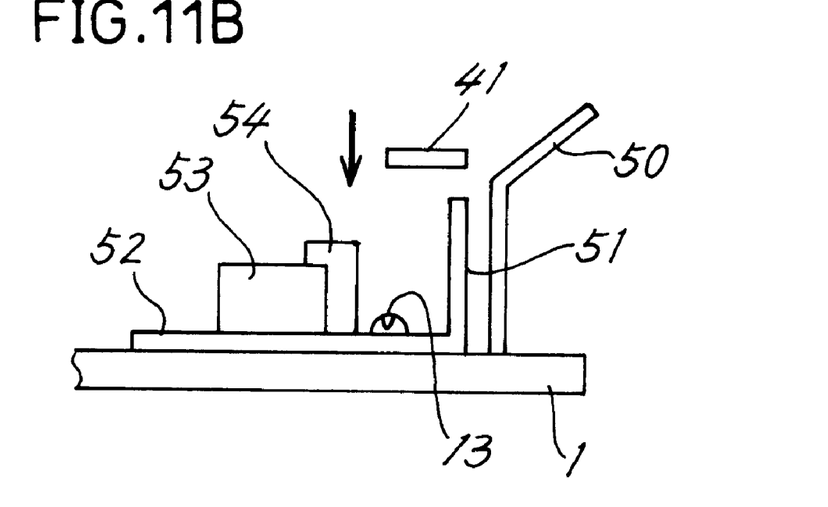
FIG. 11B is a front view of the bracket when the position of the release piece involves a variation.

If the release piece 50 is provided separately from the support wall 51, the position of the release piece 50 involves variations, entailing the likelihood that the push plate 41 will not push the release piece 50 accurately as shown in FIG. 11B. The lock slide 4 then will not be disengaged from the holder 2, failing to unload the cartridge 6.

According to the present embodiment, the holder 2 is restrained from backlashing laterally by the support wall 51 and the lateral shift restraining piece 53. The release plate 50 provided integrally with the support wall 51 diminishes variations in the lateral dimensions of the holder 2 and the release piece 50.

What is claimed is:

1. A holder mounting structure for supporting a holder on a chassis by a pivot portion upwardly and downwardly movably, the pivot portion being provided on a support wall disposed upright on the chassis, the holder mounting structure being characterized in that:

a lateral shift restraining piece is positioned on the chassis at a small distance away from an inner side surface of the holder and opposed to a side plate of the holder in a horizontal posture, the restraining piece being out of opposed relation with the side plate when the holder is in an upright posture, the holder being attachable to the support wall when in the upright posture.

2. A holder mounting structure according to claim 1 wherein a pivotal movement restraining piece is elastically deformably provided on the chassis for preventing the holder from opening excessively by the contact of an end thereof with the holder when the holder is pivotally moved upward, and the pivotal movement restraining piece elastically deforms by being pushed by the holder when the holder is pivotally moved from the upright posture to the horizontal posture to permit the holder to move past the pivotal movement restraining piece.

3. A holder mounting structure according to claim 1 wherein a cartridge is inserted into the holder, and the holder is provided with a lock slide engageable with the holder by being pushed by the cartridge inserted, the lock slide being operable to kick out the cartridge toward a direction of unloading from the holder when disengaged from the holder, the support wall being provided with a release piece for disengaging the lock slide from the holder when the holder is in a raised state.

* * * * *